Patented Jan. 6, 1948

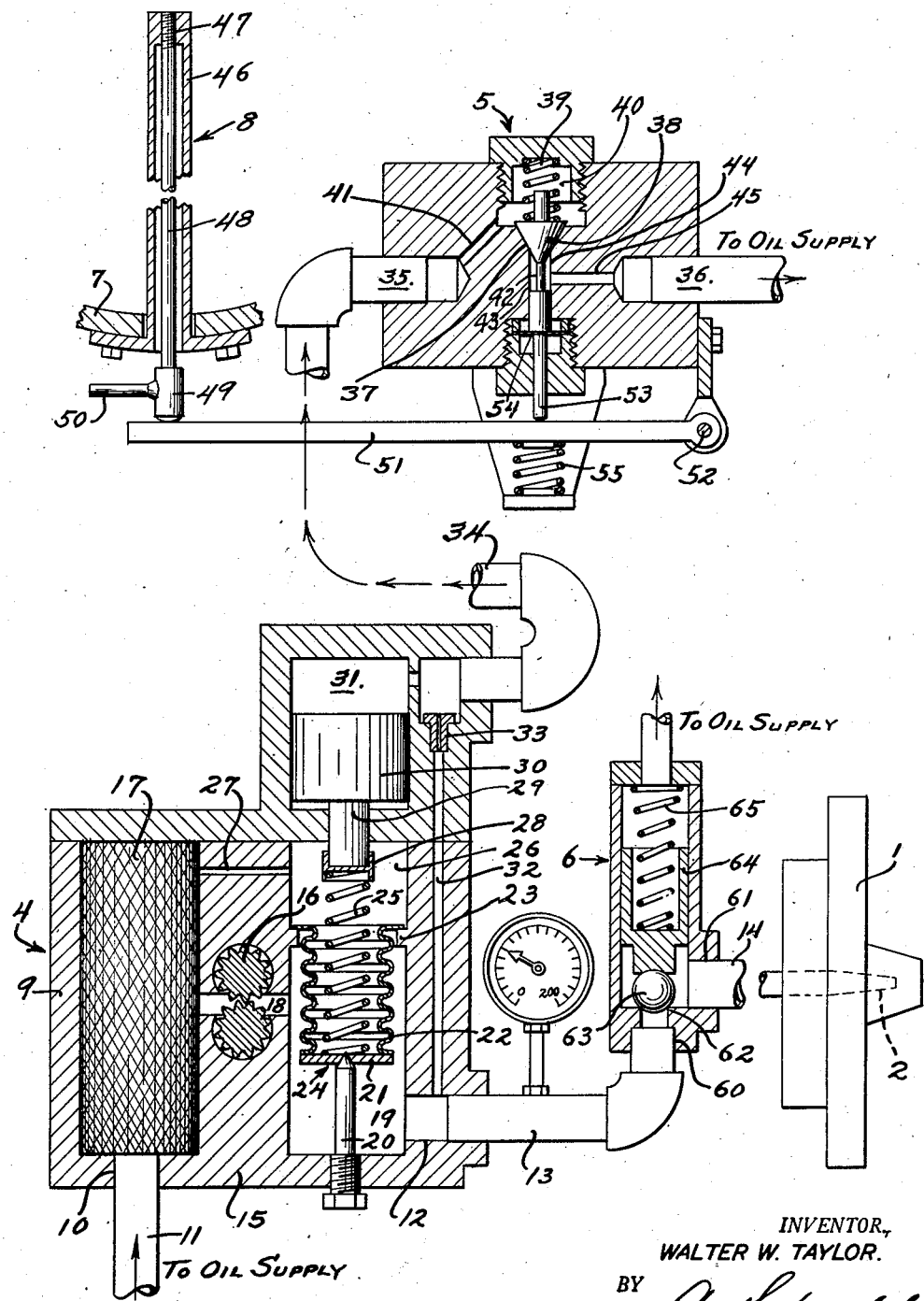

2,434,020

UNITED STATES PATENT OFFICE 2,434,020

REGULATING VALVE

Walter W. Taylor, Oakland, Calif., assignor, by direct and mesne assignments, to Malsbary Manufacturing Company, Oakland, Calif., a corporation of California Original application September 2, 1942, Serial No. 457,005, now Patent No. 2,364,489, dated December 5, 1944. Divided and this application December 26, 1942, Serial No. 470,256

6 Claims. (Cl. 137—153)

The present invention relates to a regulating valve for an oil burner using a pressure atomizing nozzle and is a division of my copending application Serial Number 457,005, filed September 2, 1942, now Patent No. 2,364,489, granted December 5, 1944, for Letters Patent on a Fuel feeding system for a burner. While the parent application is directed generally to a fuel feeding system, the present application is confined to a regulating valve used in the system.

The principal object of my invention is to provide means, in connection with a burner of the character described, for metering the fuel supply to the burner in such a manner as to maintain a desired constant temperature in a liquid or substance heated by the burner.

In carrying out this object, it is proposed to provide a regulating valve in the supply conduit for the burner, the regulating valve being adapted to vary the amount of fuel fed and the pressure under which it is fed in accordance with changes brought about in a thermostat, which latter is preferably positioned in a boiler or coil to be heated by the burner.

It is thus proposed to keep the temperature in the boiler constant and to provide a valve in the fuel line, subject to temperature control, which will fill the requirements of the burner to accomplish that object.

It is further proposed to provide a regulating valve of the character described which is simple and rugged in construction, which operates automatically to keep the temperature in the substance to be heated at a constant level, and which, after initial peak loads to secure the desired temperature, levels off to a smooth, balanced and steady flow, metering out the exact amount of fuel required to accomplish a given result.

I further propose to provide, in combination with the regulating valve, a second valve intended for the purpose of shutting off the fuel supply to the burner whenever the pressure in the feeding system drops below a certain minimum and of automatically re-opening when the pressure rises again to a predetermined degree.

In burners of the character described, it is not desirable that the burner continue to operate when the pressure drops below a certain point, because in that case the burner action becomes sluggish and soot is apt to collect about the burner orifices so as to impair the efficiency of the burner. It is desirable, therefore, that the fuel supply be cut off altogether when the pressure drops to a predetermined low point.

It is further advantageous, that after the fuel supply has been cut off completely, due to low pressure, it be not re-opened until after the pressure in the supply system has greatly increased, thus leaving a considerable differential between the pressure sufficient to keep the burner going and the pressure desirable for re-starting the burner.

If, for instance, under a given set of circumstances, it may be permissible to keep the burner going until the pressure drops to 25 pounds, it is highly desirable that the burner be not re-started until the pressure has been increased to say 75 pounds.

It is proposed, therefore, to arrange the second valve in such a manner that it automatically shuts off when the pressure drops to a predetermined minimum and remains shut off until the pressure has risen to a point much higher than the minimum, whereupon the increased pressure automatically re-opens the valve.

Further objects and advantages of my invention will appear as the specification proceeds, and the novel features thereof will be fully set forth in the claims hereto appended.

The preferred form of my invention is illustrated in the accompanying drawing forming part of this application, in which the single figure diagrammatically illustrates my fuel feeding system, the principal portions being shown in section.

While I have shown only the preferred form of my invention, I wish to have it understood that various changes or modifications may be made within the scope of the claims hereto attached, without departing from the spirit of the invention.

Referring to the drawing in detail, my invention finds its principal use in connection with an oil burner 1 having a conventional atomizing nozzle 2 to which oil is fed under pressure from a suitable source.

My system includes in its principal features, a regulating valve 4, a thermostat-operated control valve 5 for the same, and an automatic shut-off and re-starting valve, indicated at 6. A boiler 7 is assumed to be mounted above the burner so as to be heated thereby and is provided with a thermostat 8.

The object of the invention is to meter the oil to the burner in such a manner that the temperature about the thermostat remains substantially constant, to automatically shut off the fuel supply when the feeding pressure drops to a predetermined minimum, and to automatically re-start delivery of fuel to the burner only after the delivery pressure has risen to a point considerably above the said minimum pressure.

The regulating valve comprises a housing 9 having an oil intake at 10 communicating with the source of supply through a conduit 11, and an oil outlet 12 communicating through a conduit 13, the shut-off and re-starting valve 6, and a conduit 14 with the nozzle of the burner.

The housing is formed with a central partition 15 in which is mounted a conventional gear pump 16 which pumps oil from the intake 10 through a conventional strainer 17 and a passage 18 into a cylindrical chamber 19 which communicates through its outlet 12 with the burner nozzle.

The chamber 19 has a pointed pin 20 rising from the bottom thereof, and this pin cooperates with the bottom 21 of a bellows 22 mounted on a ledge 23 in the chamber in forming a pressure-relief valve 24, the bottom 21 of the bellows being urged toward the pointed end of the pin 20 by means of a spring 25 tending to close the valve.

When the pump passes an excess amount of oil through the system, the excess may escape through the valve 24 into the upper part 26 of the chamber 19, and thence through a passage 27 back to the strainer 17 to re-join the oil coming from the source of supply.

The outer end of the spring 25 bears against a seat 28 at the end of a stem 29 of a piston 30 movable in a cylindrical chamber 31 provided in the housing in alinement with the chamber 19. This piston serves the function of a movable pressure member for varying the tension of the spring 25 in accordance with fuel feed requirements for maintaining a desired temperature about the thermostat.

The movement of the piston is limited in a downward direction by the piston striking the bottom of the cylinder, and in the opposite direction by the seat 28 striking the same wall. This prevents the spring from being compressed into a solid unit which would close the valve completely, and from expanding altogether, which might relieve all pressure on the bellows.

It is apparent that when the tension of the spring is increased, less oil will be by-passed through the valve 24, and when the tension is decreased, more oil will be by-passed. It should be noted that any other suitable pressure member, such as a conventional bellows, may be substituted for the piston 30, particularly with a view of preventing leaking about the wall of the piston.

The outer end of the chamber 31 is in communication with the lower end of chamber 19 through a passage 32 which connects with chamber 31 through a restricted orifice 33, so that in the normal operation of the device, the pressure prevailing in chamber 31 is the same as that prevailing in chamber 19. The spring 25, in this condition, is under considerable tension, but still allows the valve 24 to by-pass a normal excess of oil which it is desirable to pump through the system to assure a generous oil supply.

But the chamber 31 is also connected, through the conduit 34, with valve 5 which serves as a control valve for the chamber. This valve may be of any suitable construction and comprises in its principal features an intake port 35 communicating with conduit 34, an outlet port 36 communicating with the source of supply or the strainer 17, a valve seat 37 and a valve member 38 adapted to be seated on the seat. The upper end of the valve member is acted on by a spring 39 in the chamber 40 whereby the valve member is urged upon the seat.

The chamber 40 connects with the intake port 35 through a passage 41 and the valve member 38 has a stem 42 movable in a cylinder 43, the stem being provided with an annular groove 44 communicating, through a passage 45 with the outlet port 36, so that, when the valve member 38 is lifted off its seat, oil may flow from the intake port 35 to the outlet port 36.

It should be noted that when the valve 5 is open, oil may flow through the valve from the chamber 31 at a rate quicker than the capacity of the orifice 33 is able to fill the chamber so that the pressure on the piston 30 is relieved. This again decreases the tension of the spring 25 and allows more oil to escape through the valve 24 for decreasing the pressure in chamber 19 and for lessening the flow of oil to the burner nozzle.

The valve 5 is operated by a thermostat 8 in any suitable manner. The thermostat is arranged in the boiler 7 which latter is heated by the burner 1.

While the construction of the thermostat 8 is not essential for the purposes of this invention, it might be pointed out that the same is preferably of the type illustrated in the application of Job J. Malsbary and myself on a Cleaning machine, Serial Number 249,184, filed January 4, 1939, now Patent Number 2,295,228, granted Sept. 8, 1942, and comprising in its principal features, a tube 46 of ordinary, expansible material mounted to extend into the boiler to be heated and in heat exchange relation with the liquid contained therein.

Inside of this tube, and secured to the inner end thereof, as at 47, is a rod 48 of non-expansible metal, such as Invar steel, the outer end of the rod projecting beyond the end of the tube. The operative length of the rod may be adjusted by deepening or lessening the engagement therewith of a threaded extension sleeve 49 which operation may be performed through a handle 50.

It is apparent that as the temperature in the boiler rises, the tube 46 expands and draws the outer end of the Invar steel rod 48 inwardly, whereas a dropping of the temperature has the opposite effect.

The thermostat operates the valve 5 through a lever 51 pivotally supported, as at 52, and adapted to bear on a push pin 53, which latter, through a diaphragm 54, bears on the stem 42 of the valve member 38. The free end of the lever bears on the sleeve 49 of the Invar steel rod 48 and is urged into said position by a spring 55.

The sleeve 49 on the Invar steel rod may be adjusted by means of the handle 50 to a desired temperature of the boiler or the liquid contained therein. As long as this temperature is maintained, the valve 5 remains closed with the result that the pressures in chambers 19 and 31 of the regulating valve are balanced and oil is fed to the burner in a smooth and steady flow.

If the temperature in the boiler should rise above the desired degree, expansion of the thermostat tube 46 will cause the end of the Invar steel rod to recede, with the result that spring 55, through the lever 51, pushes the pin 53 inwardly, thereby opening the valve 5. This, in turn, allows oil to escape from the chamber 31 at a rate faster than the orifice 33 can supply it, with the result that the tension of spring 25 slackens and allows more oil to escape through the valve 24. The oil feed to the burner is thus lessened, and as soon as the boiler reaches normal temperature again, the Invar rod pushes the lever 51 outward and allows the valve 5 to close which re-establishes the balance of pressure in the chambers 19 and 31.

To recapitulate, oil is pumped by the pump 16 through the chamber 19 toward the burner and normally through passage 32 into chamber 31, so that equal pressures prevail in both chambers. The valve 24 allows a certain excess of oil to escape through the passage 27. As the temperature in the boiler increases beyond the desired degree, the Invar steel rod of the thermostat 8 recedes and allows the spring 55 to open the valve 5, whereby the pressure in chamber 31 is relieved, decreasing the tension on spring 25 and allowing more oil to escape through valve 24, whereby the pressure in chamber 19 is lowered and the burner is fed less oil under less pressure until conditions right themselves.

In the system thus far described, it is desirable that when the pressure drops below a predetermined degree, say 25 pounds, feeding of oil to the burner be discontinued altogether, because feeding at lower pressures might result in incomplete combustion, the forming of soot and the clogging of the burner nozzle. It is also desirable, of course, that the burner be started again automatically as soon as the proper pressure is reestablished. It is preferable, however, to delay the restarting until a pressure considerably above the shutting-off pressure has been reached.

Assuming, for instance, that the temperature in the boiler has reached a point where the thermostat allows the valve 5 to open sufficiently far to reduce the pressure in chamber 19 to about 25 pounds. At that point it is desirable to shut off the fuel completely. A slight cooling of the thermostat would increase the pressure slightly, but it is not desirable to restart the burner while the pressure lingers about this low level. It is advantageous to delay restarting of the burner until the pressure has again increased to substantially normal operating pressure, say 75 pounds, and my control valve 6 is designed to take care of this situation.

The valve 6 comprises an intake port 60 communicating with conduit 13, an outlet port 61 connecting with conduit 14, a valve seat 62, a valve member 63, preferably of the ball type, for the seat, and a pressure member 64 urging the ball upon its seat under the influence of a spring 65. The ball is adapted to be lifted from its seat by the pressure of the incoming oil, which operation involves, of course, operation of the pressure member 64. While the valve is closed, the under surface of the ball is the only area on which the pressure is active. Once the valve is open, the flowing oil becomes active on the lower face of the pressure member for lifting the latter.

The ball and the pressure member are proportioned so that the pressure member offers much greater lifting surface to the oil than does the ball, probably about three times as much. Thus it takes three times as much pressure to open the valve than it does to retain it in open position. Under the conditions selected, oil flowing through the open valve and acting on the pressure member 64 directly, would be able to retain the valve in open position until the pressure drops to less than 25 pounds, while on the other hand, with the valve closed and the oil acting only on the smaller area of the ball, it would take about 75 pounds of pressure to reopen the valve.

Thus the valve 6 serves the function of automatically opening, say at 75 pounds pressure, of maintaining it open until the pressure drops to 25 pounds, of then closing the valve, and of automatically reopening the valve when the pressure of 75 pounds has again been reached.

I claim:

1. In a regulating valve of the character described, a housing having a chamber adapted to receive a fluid under pressure, an outlet conduit for the chamber having a restricted discharge, a pressure-relief valve for the chamber including a pressure member mounted to divide the chamber to provide a separate second compartment and operable to discharge into the latter compartment, an outlet conduit for said compartment, a second pressure member having yielding means bearing on the first pressure member for urging the relief valve closed, means for normally subjecting the second pressure member to the pressure prevailing in the first chamber, and controlled means for relieving the pressure on the second pressure member for reducing the pressure necessary to open the relief valve.

2. In a regulating valve of the character described, a housing having a chamber therein adapted to have a fuel pumped therethrough, a bellows mounted in the chamber so as to divide the same into two compartments, the end of the bellows having an aperture extending therethrough to provide a direct communication between the said compartments and to form a valve seat, a fixed member in one of the compartments cooperable with the valve seat to form a valve therewith, a spring bearing on the end of the bellows and tending to urge the valve seat upon the fixed member, a movable pressure member bearing on the free end of the spring, and a by-pass conduit arranged to conduct fuel from said chamber to bear on the movable pressure member and an outlet conduit for the second compartment.

3. In a regulating valve of the character described, a housing having a chamber therein adapted to have a fuel pumped therethrough, a bellows mounted in the chamber so as to divide the same into two compartments, the end of the bellows having an aperture extending therethrough to provide a direct communication between the said compartments and to form a valve seat, a fixed member in one of the compartments cooperable with the valve seat to form a valve therewith, a spring bearing on the end of the bellows and tending to urge the valve seat upon the fixed member, a movable pressure member bearing on the free end of the spring, and a by-pass conduit arranged to conduct fuel from said chamber to bear on the movable pressure member, the by-pass conduit including a restricted orifice instrumental in controlling the balancing of pressure on opposite sides thereof and the second compartment having an outlet conduit.

4. In a regulating valve of the character described, a housing having a chamber therein adapted to have a fuel pumped therethrough, a bellows mounted in the chamber so as to divide the same into two compartments, the end of the bellows having an aperture extending therethrough to provide a direct communication between the said compartments and to form a valve seat, a fixed member in one of the compartments cooperable with the valve seat to form a valve therewith, a spring bearing on the end of the bellows and tending to urge the valve seat upon the fixed member, a movable pressure member bearing on the free end of the spring and mounted with limited freedom of spring-actuating movement, and a by-pass conduit arranged to conduct fuel from said chamber to bear on the movable presssure member the second compartment having an outlet conduit.

5. In a regulating valve of the character described, a housing having a chamber therein adapted to have a fuel pumped therethrough, a bellows mounted in the chamber so as to divide the same into two compartments, the end of the bellows having an aperture extending therethrough to provide a direct communication between the said compartments and to form a valve seat, a fixed member in one of the compartments cooperable with the valve seat to form a valve therewith, a spring bearing on the end of the bellows and tending to urge the valve seat upon the fixed member, a movable pressure member bearing on the free end of the spring and mounted with limited freedom for spring-actuating movement, and a by-pass conduit arranged to conduct fuel from said chamber to bear on the movable pressure member, the by-pass conduit including a restricted orifice instrumental in controlling the balancing of pressure on opposite sides thereof and the second compartment having an outlet conduit.

6. In a regulating valve of the character described, a housing having a chamber therein adapted to have a fuel pumped therethrough, a member movable in the chamber and mounted to divide the same into two compartments, the said member having an aperture extending therethrough to provide a direct communication between the said compartments and to form a valve seat, a fixed member in one of the compartments cooperable with the valve seat to form a valve therewith, a spring bearing on the movable member and tending to urge the valve seat upon the fixed member, a movable pressure member bearing on the free end of the spring, a by-pass conduit arranged to conduct fuel from said chamber to bear on the pressure member, and an outlet conduit for the second compartment.

WALTER W. TAYLOR.

REFERENCES CITED

The following references are of record in the file of this patent:

UNITED STATES PATENTS

| Number | Name | Date |
|---|---|---|
| 2,064,343 | Finley | Dec. 15, 1936 |
| 2,312,877 | Campbell | Mar. 2, 1943 |
| 1,585,732 | Otto | May 25, 1926 |
| 1,770,273 | Kemma | July 8, 1930 |
| 2,115,665 | DeFlorez | Apr. 26, 1938 |
| 1,380,787 | Ellmauer | June 7, 1921 |
| 1,133,738 | Mintz | Mar. 30, 1915 |
| 1,899,396 | Ray | Feb. 28, 1933 |
| 2,100,997 | Russel | Nov. 30, 1937 |
| 2,070,411 | Powers | Feb. 9, 1937 |